United States Patent
Bosetti et al.

(10) Patent No.: US 10,337,952 B2
(45) Date of Patent: Jul. 2, 2019

(54) SYSTEMS AND METHODS FOR ICING FLIGHT TESTS

(71) Applicant: The Boeing Company, Chicago, IL (US)

(72) Inventors: Chris Bosetti, Seattle, WA (US); Fred Norman Krueger, Sammamish, WA (US); Ian Miles Gunter, Burien, WA (US); Dean Walters, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 15/640,960

(22) Filed: Jul. 3, 2017

(65) Prior Publication Data

US 2017/0299462 A1    Oct. 19, 2017

Related U.S. Application Data

(62) Division of application No. 14/488,251, filed on Sep. 16, 2014, now Pat. No. 9,696,238.

(51) Int. Cl.
*G01M 9/08* (2006.01)
*G01M 17/00* (2006.01)
*B33Y 80/00* (2015.01)

(52) U.S. Cl.
CPC ............. *G01M 9/08* (2013.01); *B33Y 80/00* (2014.12); *G01M 17/00* (2013.01)

(58) Field of Classification Search
USPC .................................................... 73/118.03
See application file for complete search history.

(56) References Cited

U.S. PATENT DOCUMENTS

| | | | | |
|---|---|---|---|---|
| 4,976,397 A * | 12/1990 | Rudolph | ............... | B64D 15/04 244/134 B |
| 5,011,098 A * | 4/1991 | McLaren | ............... | B64D 15/04 244/134 B |
| 6,237,874 B1 * | 5/2001 | Rutherford | ............ | B64D 15/14 244/134 D |
| 6,279,856 B1 * | 8/2001 | Rutherford | ............ | B64D 15/14 244/134 D |
| 7,137,596 B2 * | 11/2006 | Garrigus | ................ | B64D 15/00 244/134 R |
| 10,071,808 B1 * | 9/2018 | Bosetti | .................... | B64D 15/22 |
| 2005/0263646 A1 * | 12/2005 | Nichols | .................. | B64D 15/20 244/134 F |
| 2007/0001481 A1 * | 1/2007 | Breidenbach | ........ | B62D 35/001 296/180.1 |
| 2009/0189020 A1 * | 7/2009 | Bilgram | ................ | B64D 15/20 244/134 F |

(Continued)

OTHER PUBLICATIONS

Federal Aviation Administration, Advisory Circular: Aircraft Ice Protection, AC No. 20-73A, Aug. 16, 2006, Appendix R, 42 pages.

(Continued)

*Primary Examiner* — Eric S. McCall
(74) *Attorney, Agent, or Firm* — Kolisch Hartwell, P.C.

(57) ABSTRACT

Systems and methods for the manufacture and use of artificial ice shapes for aircraft certification, including methods of manufacturing artificial ice shapes, artificial ice component systems for attachment to aircraft, methods of flight testing aircraft having artificial ice sections attached thereto, and artificial ice testing systems.

20 Claims, 4 Drawing Sheets

(56) References Cited

U.S. PATENT DOCUMENTS

2014/0060166 A1* 3/2014 Meis .................. B64D 15/04
                                              73/118.03
2015/0206458 A1* 7/2015 Marechal ............ F01D 21/003
                                              434/401
2018/0229782 A1* 8/2018 Breidenbach ........ B62D 35/004

OTHER PUBLICATIONS

Vickerman, Mary et al., Geometry Modeling and Grid Generation for "Icing Effects" and "Ice Accretion" Simulations on Airfoils, Proceedings of the 7th International Conference on Numerical Grid Generation in Computational Field Simulations, pp. 1061-1070, Whistler, B.C., Sep. 2000.

U.S. Patent and Trademark Office, Office action in U.S. Appl. No. 14/488,251, dated Oct. 11, 2016, 12 pages.

* cited by examiner

SYSTEMS AND METHODS FOR ICING FLIGHT TESTS

CROSS-REFERENCES TO RELATED APPLICATIONS

This application is a divisional application of U.S. patent application Ser. No. 14/488,251, filed Sep. 16, 2014. The complete disclosure of the above-identified patent application is hereby incorporated by reference for all purposes.

FIELD

This disclosure relates to icing certification of aircraft. More specifically, the disclosed embodiments relate to methods and systems for manufacturing and using artificial ice shapes configured for attachment to a surface of an aircraft for icing flight tests.

BACKGROUND

An aircraft that encounters cold and moist air may be susceptible to the formation of ice on various surfaces of the aircraft. Under such conditions ice accretion on wings, turbine elements, or other surfaces may compromise the flight characteristics of the aircraft. Such conditions are referred to as "known icing conditions," and intentionally entering an area of known icing conditions is referred to as Flight Into Known Icing, or FIKI.

Various international authorities require that a new aircraft design must be certified before it can be flown under actual icing conditions. While FIKI certification takes into consideration a number of factors, one aspect of the certification process may require flight tests of the aircraft or its components in measured simulated icing conditions. Such certification test flights may require that the aircraft be flown with artificial ice shapes attached to wing and/or tail leading edges. Dry air flight tests with artificial ice shapes installed allows airplane performance and handling characteristics to be evaluated in stable dry air conditions with the critical ice shape remaining a constant (i.e., no change of ice accretion due to erosion, shedding, sublimation, etc., as can occur with natural ice shapes). In addition, the artificial ice shapes must exhibit a defined quality of surface roughness, in order to more closely match the characteristics of accreted ice.

Currently, these artificial ice shapes may be constructed on the wing itself, using fiberglass and resin. Ice shape materials may be mechanically secured to the wing surface using bolts or other fasteners. Artificial surface roughness features are typically achieved by modification of the surface of the ice shape after attachment to the aircraft. As a result, FIKI certification is both time-consuming and expensive. Furthermore, when the certification flight is completed, removal of the artificial ice shapes often causes damage to surfaces of the test aircraft, further increasing the cost of the process.

SUMMARY

The present disclosure provides systems and methods for the manufacture and use of artificial ice shapes for aircraft certification.

In some embodiments, the disclosure provides a method of manufacturing an artificial ice shape that may include designing an artificial ice component having an inner surface contoured to complement a selected aircraft surface, and an outer surface contoured in conformance with FAA icing certification requirements; and manufacturing the artificial ice component prior to installing the component on the selected aircraft surface.

In some embodiments, the disclosure provides an artificial ice component system, that may include a set of artificial ice sections configured for sequential adjacent attachment to an aircraft surface, collectively forming an artificial ice component complying with FAA icing certification requirements.

In some embodiments, the disclosure provides a method of flight testing an aircraft, that may include creating a set of artificial ice sections complying with FAA icing certification requirements, the ice sections being configured for sequential adjacent attachment to a surface of an aircraft, each ice section being marked to indicate a specific mounting location relative to other ice sections in the set; attaching the set of artificial ice sections to the surface of the aircraft via a double-sided adhesive system; flight testing the aircraft; and removing the ice sections from the aircraft by disrupting the adhesive system.

In some embodiments, the disclosure provides an artificial ice testing system, that may include a set of artificial ice sections configured for sequential adjacent attachment to a vehicle surface, collectively forming an artificial ice component complying with FAA icing certification requirements; double-sided foam tape configured for attaching the artificial ice sections on a surface of an aircraft; and line members configured for inclusion between artificial ice sections and the surface of the aircraft, and for disruption of the double sided foam tape to remove the ice sections from the surface.

The features, functions, and advantages may be achieved independently in various embodiments of the present disclosure, or may be combined in yet other embodiments, further details of which can be seen with reference to the following description and drawings.

DESCRIPTION

Overview

Figure 1:
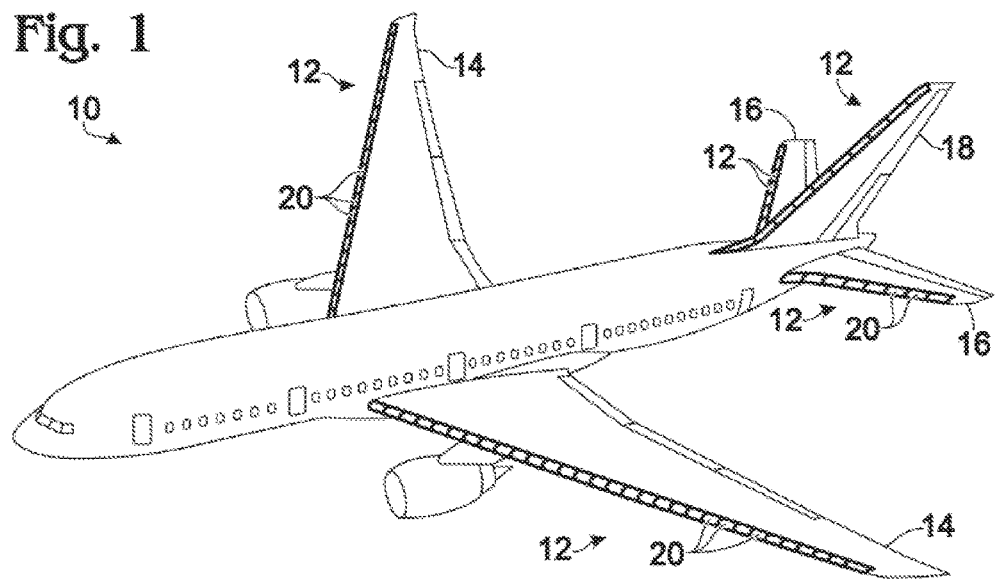
FIG. 1 is a perspective view of an aircraft equipped with an illustrative artificial ice component system.

Various embodiments of an artificial ice component having an inner surface contoured to complement a selected aircraft surface, and an outer surface contoured in conformance with FAA icing certification requirements are described below and illustrated in the associated drawings. Unless otherwise specified, the artificial ice component and/or its various constituents may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other artificial environmental accretions for use on any of a variety of vehicles. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Specific Examples, Major Components, and Alternatives

The following example describes illustrative artificial ice shapes configured for attachment to a selected aircraft surface in order to facilitate aircraft certification for flying into known icing conditions. These examples may include descriptions of the artificial ice shapes themselves, methods of manufacturing the artificial ice shapes, methods of attaching the artificial ice shapes to an aircraft, systems for attachment of artificial ice shapes to an aircraft, and systems for facilitating icing certification testing. These specific examples are intended for illustration and should not be interpreted as limiting the entire scope of the present disclosure. Each example may include one or more distinct inventions, and/or contextual or related information, function, and/or structure.

Example 1

Figure 2:
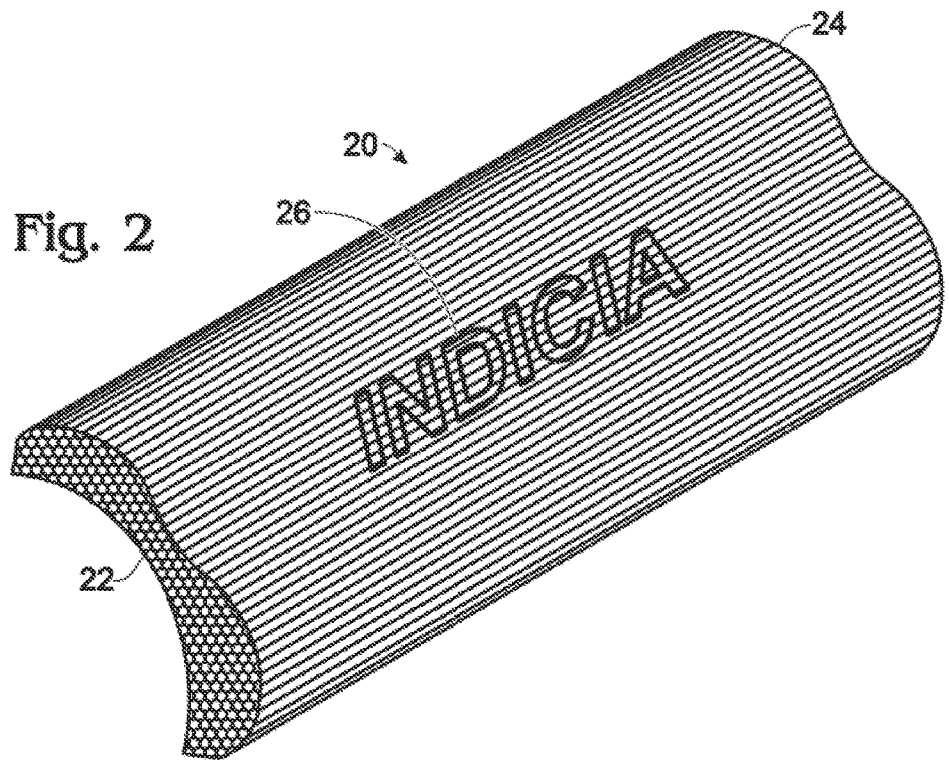
FIG. 2 is a perspective view of an illustrative artificial ice section.
Figure 3:
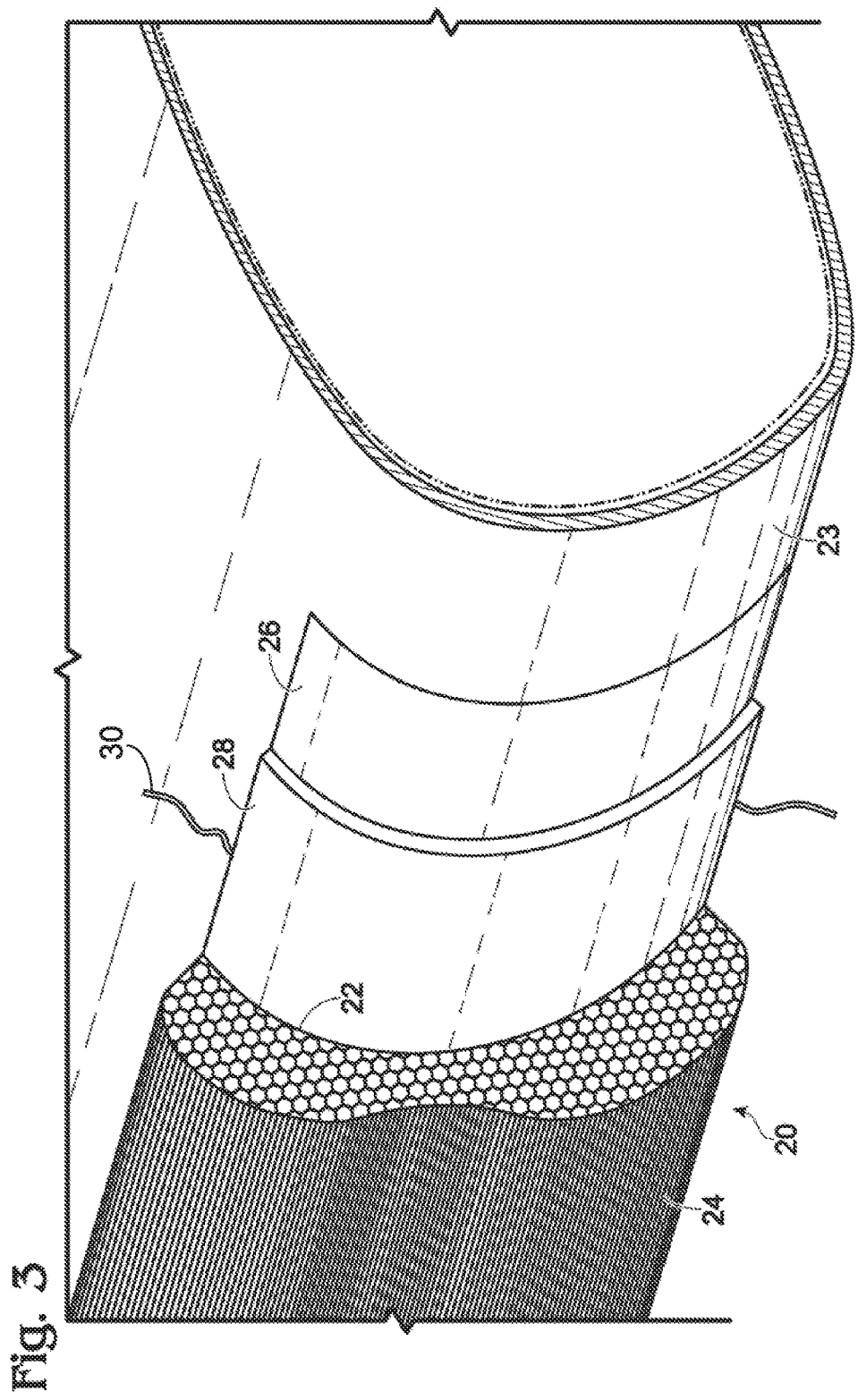
FIG. 3 is a cut-away view of an illustrative artificial ice section attached to the leading edge of a wing.

This example describes an illustrative artificial ice component having an inner surface contoured to complement a selected aircraft surface, and an outer surface contoured in conformance with FAA icing certification requirements, as shown in FIGS. 1-3.

FIG. 1 depicts an aircraft 10 equipped with an illustrative artificial ice component 12, for example in preparation for flight testing associated with certification for flying into known icing conditions, hereafter referred to as icing certification. The certification may be regulated by any of a variety of administrative organizations worldwide. In the United States, for example, the certifying authority is the Federal Aviation Administration, or FAA, and in order for a test flight to be accepted by the FAA for icing certification, the aircraft must be equipped with artificial ice shapes that satisfy criteria established by the FAA for such certification test flights, and in particular the artificial ice shapes may exhibit a predefined surface roughness to simulate the aerodynamic effect of ice accretion.

Artificial ice component 12 may be configured to be attached to the leading edge of an aircraft surface. For example, artificial ice component 12 may be configured to be attached to the leading edge of a wing 14, a horizontal stabilizer 16, or a vertical stabilizer 18 as shown in FIG. 1. Alternatively, the artificial ice components of the present disclosure may be configured for attachment to other aircraft structures and surfaces, such as canards, winglets, strakes, pitot tubes, antennae, landing gear, windshields, or the nose of the aircraft, among others.

The artificial ice component 12 typically includes a plurality of individual artificial ice sections 20 that, when considered in combination, define the artificial ice component 12. The individual artificial ice sections 20 may each include an inner surface 22 that is contoured to complement a selected aircraft surface 23, and may be configured to be attached to the selected aircraft surface as a linear arrangement of ice sections 20 each disposed adjacent to a neighboring ice section. The individual artificial ice sections 20 may further include an outer surface 24 having a surface roughness conforming to icing certification requirements.

Further, in order to facilitate manufacture and simplify the attachment of the individual artificial ice sections 20 to the desired aircraft surface, each artificial ice section 20 may further include a surface indication 26 that identifies the specific point of attachment on the aircraft surface for that individual ice section, and/or identifies the location of that ice section relative to one or more other ice sections. Indication 26 may be integral with the ice section 20 or may be removable, such as a sticker. Indication 26 may be disposed on the surface of the ice section such as for example on the outer surface 24, on an end surface, or on an inner surface of the ice section 20. Indication 26 may be formed by application of paint, ink or some other colorant, or the indication may be formed in relief on the outer surface, either by creating a depression in the surface or by raising the indication in relief. The indication 26 may be machined into the outer surface 24, or may be integrally formed as part of the manufacture of the ice section.

In one embodiment, each of a plurality of artificial ice sections is configured to be sequentially attached to the selected aircraft surface in an adjacent relationship, and each ice section includes an indicator on a surface of the ice section identifying where that ice section is to be located on the aircraft surface relative to the other artificial ice sections. The artificial ice section indicia may include, but are not required to include, numerical indicia such as sequential numbering.

Various alternative indicia may also be present on or in the artificial ice sections, including for example markings to indicate the appropriate orientation of the section on the aircraft, such as by identifying an inboard and/or an outboard portion of the section.

Example 2

This example describes an illustrative method of designing a digital model for an artificial ice component having an inner surface contoured to complement a selected aircraft surface, and an outer surface contoured in conformance with FAA icing certification requirements.

Aspects of the present example may be embodied as a computer method, computer system, or computer program product. Accordingly, aspects of the present disclosure may take the form of an entirely hardware embodiment, an entirely software embodiment (including firmware, resident software, micro-code, and the like), or an embodiment combining software and hardware aspects, all of which may generally be referred to herein as a "module," or "system." Furthermore, aspects of the present disclosure may take the form of a computer program product embodied in a computer-readable medium (or media) having computer readable program code/instructions embodied thereon.

A program or application that is capable of carrying out Computer Aided Design (CAD) may be useful for creating a digital model for a desired artificial ice component, provided that the resulting digital model has sufficient resolution to define the surface roughness features of the outer contour of the artificial ice component with the desired detail. In particular, a program or application that is capable of generating a three-dimensional digital CAD model and facilitates subsequent Computer Aided Manufacturing (CAM) methods, such as CATIA engineering and design software (Dassault Systems), may be particularly suitable for the purposes of the present method.

An illustrative digital design process may begin by defining a footprint of the artificial ice component on the aircraft surface to be covered by the ice component. Where the aircraft surface is the leading edge of a wing, for example, the footprint of the ice component may be determined by the length of the leading edge, the height of the leading edge, and the surface contour of the leading edge. The digital model of the ice component is defined so that the resulting artificial ice component will cover the leading edge to the extent necessary to satisfy icing certification requirements.

Similarly, the thickness and overall surface contour of the artificial ice component may be selected to reflect any of a variety of real-world icing conditions, from light icing to heavy ice accretion. The size and shape of the artificial ice component may be selected to substantially correspond to simulated critical ice shape configurations for the aircraft undergoing certification. The surface roughness of the artificial ice shape may be selected to reflect an empirically determined ice shape texture, or be about 3 mm in height with a particle density of about 8 to 10 per $cm^2$ (see, for example, Federal Aviation Administration Advisory Circular no. 20-73A, *AIRCRAFT ICE PROTECTION*, Appendix R, dated Aug. 16, 2006).

The overall size of the digital model for the artificial ice component may be quite large, and it may therefore be convenient to render the digital model in discrete units, where each unit corresponds to an individual artificial ice section. For example, the size of individual ice sections may be selected in consideration of the available manufacturing capacity, or in view of limitations in transporting the ice sections. Additionally, by rendering the digital model of the artificial ice component as a collection of individual ice sections, the resulting fabricated artificial ice component exhibit an enhanced tolerance for flexing of the underlying aircraft surface, for example where under underlying aircraft surface is the leading edge of a wing.

Calculation of the digital model may include, in no particular order, defining an overall length for the entire artificial ice component, defining an inner contour to match the complementary contour of the selected aircraft surface to which the ice component may be attached, defining a number of ice sections in which to divide the ice component such that in combination the sections may form the ice component, and defining a desired type and magnitude of surface roughness present on or in the outer contour. For example, the digital model may begin with a calculation of the overall size and shape of the artificial ice component, and the model may then be subdivided into multiple artificial ice sections. Alternatively, a set of individual ice sections may be modeled individually in such a way that their placement in sequence yields a desired overall size and shape desired for the artificial ice component.

The digital model optionally may include a representation of surface indication 26 to identify the specific point of attachment on the aircraft surface for that individual ice section.

Where the digital model may be used for Computer Aided Manufacturing of the artificial ice component, the digital model may include details of the internal structure of the artificial ice component, for example where the artificial ice component may include one or more internal cavities. The interior of an artificial ice section may be substantially solid throughout, substantially hollow, or it may incorporate an internal framework, such as a lattice or a honeycomb structure, in order to help provide the ice section with strength and resiliency while minimizing the overall weight of each ice section.

Figure 4:
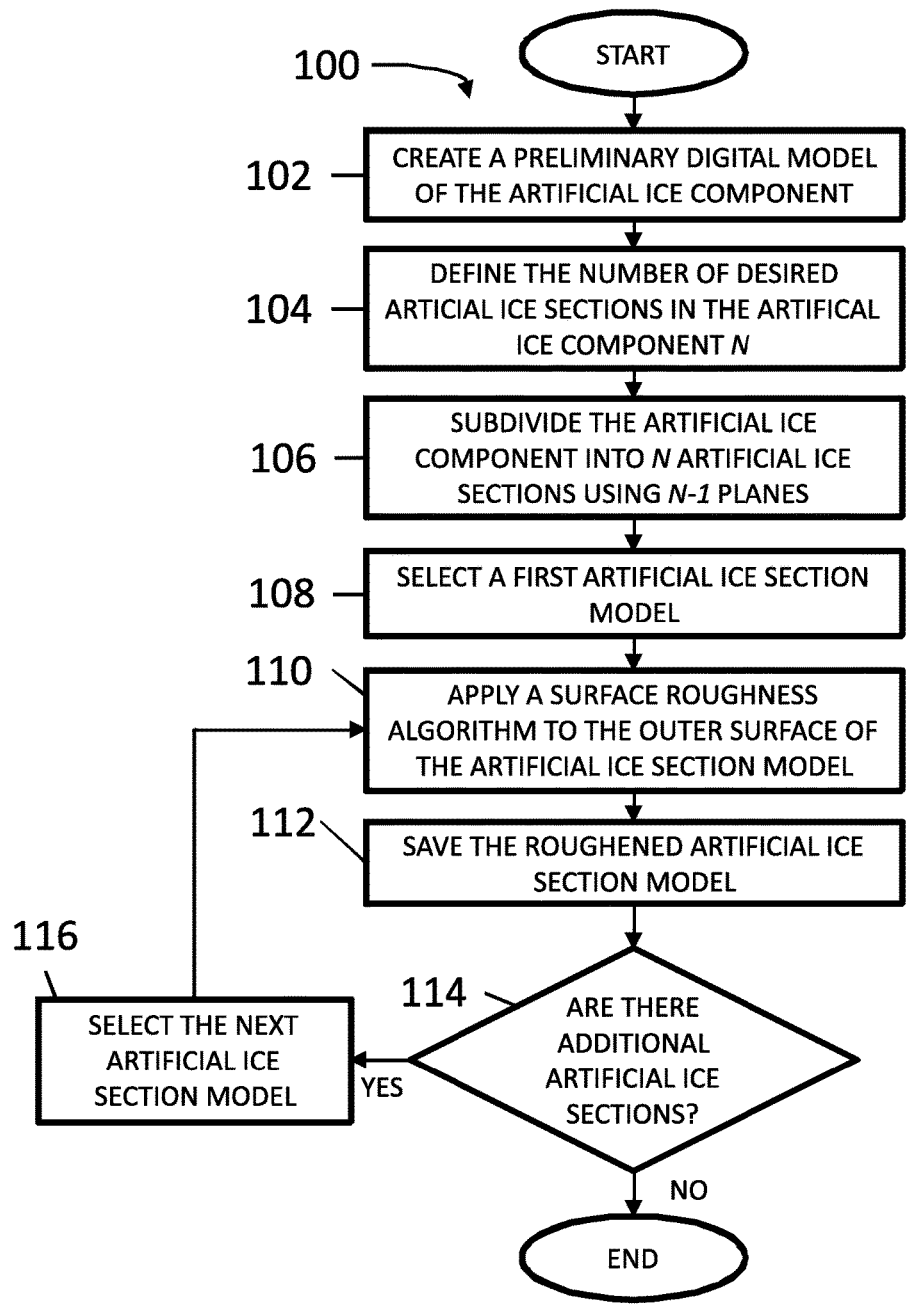
FIG. 4 is a flowchart depicting an illustrative method of designing a digital model for an artificial ice component

An illustrative method of designing a digital model for an artificial ice component is depicted by flowchart 100 of FIG. 4. Flowchart 100 should not be considered to be the only or exclusive method of designing an appropriate digital model for the purposes of the present disclosure.

At 102, a preliminary digital model of the entire artificial ice component is created. The preliminary digital model may include, but is not limited to, the artificial ice component for one entire leading edge of a wing or stabilizer. The preliminary digital model may therefore include a length corresponding to the length of the leading edge being subjected to simulated icing. The preliminary digital model may further reflect an under or inner surface calculated to be complementary to the surface of the leading being subjected to simulated icing. The preliminary digital model may further include an initial or bulk thickness that generally corresponds to the thickness of the desired artificial ice component.

At 104, a number N is selected that corresponds to the number of subsections, or artificial ice sections, that the preliminary digital model may be divided into for further modeling. The number of subsections may be determined by selecting a desired length of each subsection, for example, a subsection length may be selected that is particularly convenient for downstream fabrication methods. In one illustrative example, the preliminary digital model may be divided into 20 inch subsections.

Once the value of N is selected, the digital model of the artificial ice component may be subdivided by N−1 planes into N artificial ice section models, at 106.

At this point, a first artificial ice section model may be selected for further processing, at 108, and at 110 the initial dimensions of the ice section model are modified by the application of a surface roughness algorithm to the digital model, where the surface roughness algorithm is configured to generate surface features that, when reproduced on the artificial ice section, will satisfy the requirements established by the FAA or other certifying authority for flight testing of aircraft for icing conditions. This may involve surface features that create an appropriate degree of roughness for the artificial ice section.

When the digital model of the artificial ice section model has been modified appropriately, the roughened artificial ice section model is saved at 112. The next artificial ice section model may then be selected in an iterative process at 114 and 116 until all the subcomponents of the artificial ice component have been finalized.

The calculations to create the desired digital model of the artificial ice shapes of the present disclosure may be carried out on a suitable data processing system, which may include a communications framework to provide communications between one or more processor units, memory, persistent storage, communications units, input/output (I/O) units, and displays.

Instructions for an operating system, applications, and/or programs may be located in one or more storage devices in communication with the one or more processor units through the communications framework. The instructions may be in a functional form on a persistent storage. These instructions may be loaded into a memory for execution by a processor unit.

These instructions may be referred to as program instructions, program code, computer usable program code, or computer readable program code that may be read and executed by a processor. The program code in the different embodiments may be embodied on different physical or computer-readable media.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present disclosure may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

The computer program code or instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the present disclosure. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Example 3

This example describes an illustrative method of fabricating an artificial ice component having an inner surface contoured to complement a selected aircraft surface, and an outer surface contoured in conformance with FAA icing certification requirements.

Once a digital model of the desired artificial ice component has been created, as discussed in Example 2 above, the artificial ice component may be fabricated. By using a digital model, the ice component may be fabricated using any of a variety of computer controlled and/or computer assisted manufacturing methods. Any fabrication method that can be used to create a physical object based upon and corresponding to a preexisting three-dimensional digital model may be suitable for the present method.

Most methods of computer controlled manufacturing may be considered either subtractive methods, which involve the removal of material from a larger blank, or additive methods, which involve incrementally building up the desired object from a raw material.

Subtractive Manufacturing

Subtractive manufacturing may utilize conventional machining techniques such as milling, turning, and drilling, but may do so with a substantially higher degree of accuracy because the tools used are controlled by a computer and guided by an existing digital model. More sophisticated methods may also be employed in substrative manufacturing, such as electrical discharge machining (EDM), laser cutting, and water jet cutting, among others.

Additive Manufacturing

Additive manufacturing, or Additive Layer Manufacturing (ALM), is sometimes referred to as 3D printing. ALM typically is used to create a desired solid object from an existing three-dimensional digital model by building up the desired object incrementally, through the addition of a raw material that is then joined or fused to add to the object. The raw material is typically applied in layers, where the thickness of the individual layers may depend upon the technology and/or techniques used for the fabrication.

In a basic form of ALM, layers are formed by the extrusion of a fluid that hardens immediately. Examples of materials used in extrusion ALM include molten plastics, low-melting point metals and metal alloys, rubbers, silicones, etc. Alternatively, the extruded material may be a metal wire that is melted/fused using an electron beam (also known as electron beam freeform fabrication, or EBF3).

More typically the raw material is in the form of granules or powder, applied as a layer and then selectively fused by a heat source. In many cases, the upper surface of a bed of such material is fused, and the growing workpiece is then lowered slightly into the bed itself. A fresh layer of raw material is then applied to the bed, and the next layer is fused onto the previous one. The granular raw material may include for example thermoplastic polymer, metal powder, metal alloy powder, or ceramic powder, which may be fused using a computer-controlled heat source, such as a scanning laser or scanning electron beam. Exemplary methods include selective laser melting (SLM) direct metal laser sintering (DMLS), selective laser sintering (SLS), fused deposition modelling (FDM), and electron beam melting (EBM) among others.

Another additive method resembles an inkjet 3D printing system, where a raw material (powder, resin, etc.) and a binder are applied in discrete layers using an inkjet-like process. Alternatively, a raw material that is a photo- or heat-sensitive material may be applied in layers and then selectively cured using a scanning heat source or light source, for example as in stereo lithography.

Lamination is another additive process where multiple laminates may be bonded together to fabricate the desired shape. In some instances the individual laminae are cut to shape and then bonded together, while in others the laminate material is formed, and then shaped by a subtractive process.

Additive manufacturing may be particularly useful for the fabrication of artificial ice components of the present disclosure, as ALM permits the formation of objects with a high degree of precision, including details of internal structure.

Example 4

Figure 5:
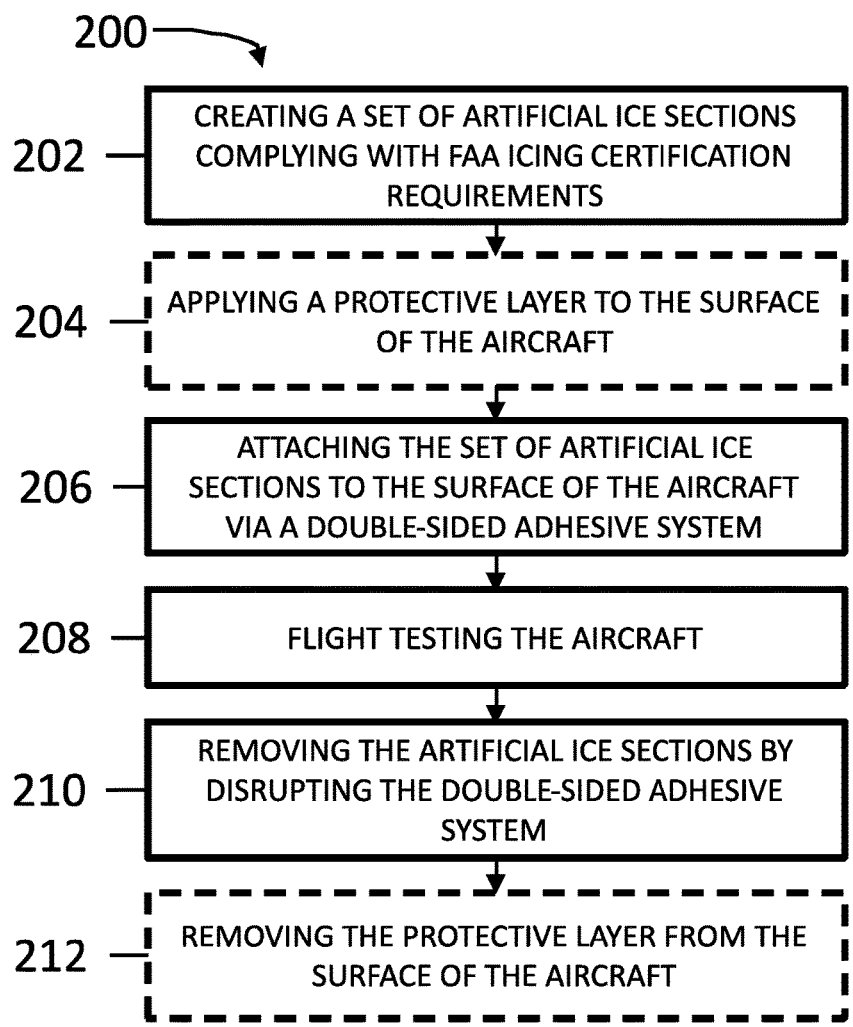
FIG. 5 is flowchart depicting an illustrative method of flight testing an aircraft.

This example describes an illustrative method of flight testing an aircraft, as shown FIG. 3 and in flowchart 200 of FIG. 5

The artificial ice component 12 including a set of artificial ice sections 20 is first created, as discussed above in Example 4 and as shown at 202. The artificial ice sections may be manufactured to possess an outer surface 24 having a surface roughness that conforms to FAA icing certification requirements, and to include an inner surface 22 configured to complement a contour 23 of a selected aircraft surface.

The method of flight testing may optionally further include applying a protective layer 26 to the contour 23 of the aircraft surface, at 204 of flowchart 200. When present, the protective layer 26 may incorporate an adhesive. The protective layer 26 may be selected so that the artificial ice component 20 may be firmly affixed to the protective layer 26 and be retained in place throughout flight testing. The protective layer 26 may further be selected so that after flight testing, the protective layer may be readily removed with little or no damage to the underlying aircraft surface 23.

The protective layer 26 may include an adhesive tape, such as a metallized adhesive type. The protective layer may include an aluminized adhesive tape having an aluminum foil backing and an acrylic adhesive, such as may commonly be referred to as speed tape. The protective layer may be selected for adhesive strength, durability, and resistance to low temperatures.

A double-sided adhesive substrate 28 is used to attach the artificial ice section 20 to the aircraft surface, at 206 of flowchart 200. The double-sided adhesive substrate 28 may be applied to the protective layer 26, when present, so that the double-sided adhesive substrate 28 attaches the artificial ice component 20 to the protective layer 26, and thereby to the aircraft surface 23. In one embodiment, the double-sided adhesive substrate is selected to be at least somewhat resilient, so that minor differences between the inner contour of the ice component and the contour of the aircraft surface may be accommodated. The double-sided adhesive substrate 28 may incorporate a thin and resilient layer of foam coated on opposing faces with adhesive, such as for example double-sided foam tape.

Individual artificial ice sections may be affixed to the double-sided adhesive substrate in sequence, and adjacent to one another, so that the inner contour of each ice section matches the surface contour of its underlying aircraft surface. As discussed above, the inclusion of surface indicia may be helpful to ensure that each artificial ice section is placed appropriately so that in combination they form the desired artificial ice component.

It should be appreciated that as the surface roughness features of the artificial ice component may be incorporated into the original digital model, and therefore may be reproduced during fabrication of each ice section, that once the artificial ice component is affixed to the aircraft appropriately, the aircraft may be ready for flight testing. That is, no further sculpting, machining, modifying, or other structural changes may be required once the artificial ice component has been attached, representing a substantial savings in both time and man-hours.

One the artificial ice component has been attached to the aircraft, the aircraft may undergo certification flight testing, at 208 of flowchart 200. Once flight testing is complete, the artificial ice component may be removed.

In one illustrative example, the attachment of the artificial ice sections to the aircraft may further include the insertion of one or more disruption lines 30 between adjacent units of the double-sided adhesive substrate 28. The disruption line 30 may include any string, cord, or wire that may be prepositioned beneath the artificial ice sections in such a way that a translation of the disruption line 30 along with wing disrupts the double-sided adhesive substrate 28. For example, where the double-sided adhesive substrate 28 includes double-sided foam tape, the disruption line 30 may be selected so that the translation of the line disrupts the foam layer of the double-sided foam tape, quickly releasing the individual sections 20 of the artificial ice component 12, at 210 of flowchart 200.

For example, where the artificial ice component is being applied to the leading edge of a wing, the disruption line may be oriented vertically, and inserted beneath the double-sided foam tape such that the line wraps around the leading edge with each end of the line extending beyond the artificial ice component, as shown in FIG. 3. When it becomes desirable to remove the artificial ice component, each end of the disruption line may be grasped firmly and pulled laterally along the leading edge. As it translates along the wing surface, the line moves through and disrupts the foam substrate of the double-sided foam tape, releasing the artificial ice components. The removal of the artificial ice components may therefore be accomplished quite rapidly.

Once the double-sided adhesive substrate has been disrupted, and the artificial ice component has been removed, the aircraft may be restored to its original condition by simply removing the protective layer 26 applied to the aircraft, if present, at 212 of flowchart 200. In this way the modification of the aircraft for certification purposes is rapidly reversed, and damage to wings, stabilizers and other surfaces may be minimized or avoided entirely.

Example 5

This example describes an illustrative method of attaching an artificial environmental accretion to a vehicle surface.

While the artificial ice shapes and the method of attaching them to an aircraft described herein possess several advantages over previous methods of preparing aircraft for icing certification test flights, many aspects of the described system and method may be applied beyond the aircraft industry.

Many types of environmental accretion may have a deleterious effect, in a wide variety of situations. The accumulation of mud on a wheeled motor vehicle may negatively impact air resistance, and thereby reduce fuel economy. The accumulation of ice and snow on other types of vehicles may be modeled using the presently described methods, as well as the accretion of organic debris, such as duff, moss, plant debris, and the like.

For such applications, an artificial environmental accretion may be created by first designing an artificial environmental accretion component having an inner surface contoured to complement a selected vehicle surface, and an outer surface contoured to simulate a selected environmental accretion. The artificial environmental accretion may then be manufactured according to the design, and prior to installing the component on the selected vehicle surface.

Example 6

This section describes additional aspects and features of the artificial ice components of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A method of manufacturing an artificial ice shape, comprising:

designing an artificial ice component having an inner surface contoured to complement a selected aircraft surface, and an outer surface contoured in conformance with FAA icing certification requirements; and manufacturing the artificial ice component prior to installing the component on the selected aircraft surface.

A1. The method of paragraph A0, wherein the artificial ice component includes a set of sections configured for sequential adjacent attachment to the selected aircraft surface.

A2. The method of paragraph A1, wherein the artificial ice component is configured for installation on a leading edge of a wing of an aircraft.

A3. The method of paragraph A1, wherein the artificial ice component is configured for installation on a leading edge of a horizontal or a vertical stabilizer of an aircraft.

A4. The method of paragraph A1, wherein the manufacturing step includes producing the sections of the artificial ice component by additive layer manufacturing.

A5. The method of paragraph A1, wherein the manufacturing step includes producing one or more sections with a honeycomb internal structure.

A6. The method of paragraph A1, wherein the designing step includes configuring each section of the artificial ice component for attachment to a particular location on the selected aircraft surface.

A7. The method of paragraph A1, wherein the manufacturing step includes the step of marking each section with an indication of where the section is to be located relative to the other sections when attached to the aircraft surface.

A8. The method of paragraph A0, wherein the designing step includes the step of specifying surface roughness features for the artificial ice component in compliance with FAA icing certification requirements.

B0. A method of attaching artificial ice to an aircraft surface, comprising:

creating an artificial ice component having a surface roughness conforming to FAA icing certification requirements, and an inner surface configured to complement a contour of an aircraft surface; and affixing the inner surface of the artificial ice component to the corresponding complementary aircraft surface.

B1. The method of paragraph B0, wherein the affixing step includes applying a double-sided adhesive substrate between the inner surface of the artificial ice component and the complementary aircraft surface.

B2. The method of paragraph B0 wherein the creating step includes forming roughness features on an outer surface of the artificial ice component prior to the affixing step.

B3. The method of paragraph B0, wherein the creating step includes:

producing a set of sections, collectively forming the artificial ice component, and configured for sequential adjacent attachment to the aircraft surface.

B4. The method of paragraph B0, wherein the vehicle surface is a leading edge of a wing of the airplane.

B5. The method of paragraph B0, wherein the vehicle surface is a leading edge of a horizontal stabilizer or vertical stabilizer of the airplane.

B6. The method of paragraph B0, further comprising:

providing a foam layer between the artificial ice component and the vehicle surface.

B7. The method of paragraph B1, further comprising:

providing a line between the artificial ice component and the vehicle surface, and adjacent to the adhesive substrate.

B8. The method of paragraph B1, wherein the double-sided adhesive substrate is a double-sided foam tape.

C0. A method of manufacturing an artificial environmental accretion, comprising:

designing an artificial environmental accretion component having an inner surface contoured to complement a selected vehicle surface, and an outer surface contoured to simulate a selected environmental accretion; and manufacturing the artificial environmental accretion component prior to installing the component on the selected vehicle surface.

C1. The method of paragraph C0, wherein the artificial environmental accretion component is contoured to simulate an accretion of mud, snow, or ice.

C2. The method of paragraph C0, wherein the selected vehicle is a wheeled motor vehicle.

D0. An artificial ice component system, comprising:

a set of artificial ice sections configured for sequential adjacent attachment to an aircraft surface, collectively forming an artificial ice component complying with FAA icing certification requirements.

D1. The artificial ice component system of paragraph D0, wherein each artificial ice section has an inner surface contoured to conform to a specific location on a leading edge of a wing of a selected model of aircraft.

D2. The artificial ice component system of paragraph D0, wherein each artificial ice section has an inner surface contoured to conform to a specific location on a leading edge of a horizontal stabilizer or vertical stabilizer of a selected model of aircraft.

D3. The artificial ice component system of paragraph D0, wherein each artificial ice section includes digitally designed surface roughness features on an outer surface the comply with FAA icing certification requirements.

D4. The artificial ice component system of paragraph D0, further comprising:

double-sided foam tape for affixing each artificial ice section to the aircraft surface.

D5. The artificial ice component system of paragraph D0, wherein each artificial ice section is marked indicating where that section is to be located relative to the other sections on the aircraft surface.

E0. A method of flight testing an aircraft, comprising:

creating a set of artificial ice sections complying with FAA icing certification requirements, the ice sections being configured for sequential adjacent attachment to a surface of an aircraft, each ice section being marked to indicate a specific mounting location relative to other ice sections in the set;

attaching the set of artificial ice sections to the surface of the aircraft via a double-sided adhesive system;

flight testing the aircraft; and removing the ice sections from the aircraft by disrupting the adhesive system.

E1. The method of paragraph E0, wherein the adhesive system includes a double-sided foam tape configured for attaching the artificial ice sections to the surface of the aircraft, and line members configured for disrupting the adhesive system attaching the artificial ice sections and the aircraft after flight testing.

E2. The method of paragraph E0, further comprising:

including plural line members between artificial ice sections and the surface of the aircraft, the removing step including disrupting the adhesive system by translating the line members through the adhesive system.

E3. The method of paragraph E0, wherein the creating step includes digitally designing surface roughness features for the artificial ice sections in compliance with FAA icing certification requirements.

E4. The method of paragraph E0, further comprising:

applying a protective layer to the surface of the aircraft prior to the attaching step.

E5. The method of paragraph E0, wherein the surface of the aircraft includes a leading edge of a wing.

E6. The method of paragraph E0, wherein the surface of the aircraft includes a leading edge of a vertical stabilizer or a horizontal stabilizer.

E7. The method of paragraph E0, wherein the reversible adhesive system includes double-sided foam tape and the line member is a string, the removing step including, for each section, pulling the string through the double-sided foam tape to detach the section from the surface of the aircraft.

F0. An artificial ice testing system, comprising:

a set of artificial ice sections configured for sequential adjacent attachment to a vehicle surface, collectively forming an artificial ice component complying with FAA icing certification requirements;

double-sided foam tape configured for attaching the artificial ice sections on a surface of an aircraft; and line members configured for inclusion between artificial ice sections and the surface of the aircraft, and for disruption of the double sided foam tape to remove the ice sections from the surface.

F1. The artificial ice testing system of paragraph F0, wherein the artificial ice sections include digitally designed artificial surface roughness features complying with FAA icing certification requirements.

F2. The artificial ice testing system of paragraph F0, wherein each artificial ice section has an inner surface contoured to conform to a specific location on a leading edge of a wing of a selected model of aircraft.

F3. The artificial ice testing system of paragraph F0, wherein each artificial ice section has an inner surface contoured to conform to a specific location on a leading edge of a vertical stabilizer or a horizontal stabilizer of a selected model of aircraft.

G0. A testing system, comprising:

a computer programmed to generate a digital model of an artificial ice component that includes surface roughness features in compliance with FAA icing certification requirements;

a manufacturing apparatus configured to fabricate the artificial ice component from the digital model generated by the computer; and an adhesion system configured to affix the artificial ice component, produced by the manufacturing apparatus, to an aircraft surface during icing certification testing.

G1. The testing system of paragraph G0, wherein the digital model corresponds to a set of digital artificial ice section models that in combination form the digital model of the artificial ice component.

G2. The testing system of paragraph G0, wherein the manufacturing apparatus is configured to fabricate the artificial ice component as a set of artificial ice sections configured for sequential adjacent attachment to the aircraft surface, G3. The testing system of paragraph G0, wherein the adhesion system includes a disruptable matrix sandwiched between opposing adhesive faces.

G4. The testing system of paragraph G3, wherein the adhesion system includes double-sided foam tape.

G5. The testing system of paragraph G3, further comprising:

line configured for mounting between an artificial ice component and an aircraft surface, and aiding in disruption of the disruptable matrix of the adhesion system and removal of the artificial ice component from the aircraft surface after certification testing.

Advantages, Features, Benefits

The different embodiments of the artificial ice shapes, their manufacture and use as described herein provide several advantages over known solutions for attaching artificial ice shapes to aircraft for FIKI flight testing. Artificial ice shapes have been manufactured in place on the leading edges of wing and tail surfaces, either using fiberglass and resin or by mechanically fastening the shapes to the aircraft. In either case, in order to achieve the required quality of surface roughness for certification, the ice shapes had to be sculpted and shaped in place on the wing surface in an awkward and time-consuming manner, a process that might require weeks. Even after flight testing was complete, removal of the ice shapes could then take several additional days, and often resulted in damage to the leading edges of wing surfaces.

While not all embodiments described herein may provide the same advantages or the same degree of advantage, illustrative embodiments of the artificial ice shapes described herein may be installed in only a few days, and removed in one day. No adjustment of surface roughness may be needed, because the ice shapes are manufactured with an appropriate surface roughness. Additionally, they can be removed from wing surfaces with little or no damage to the aircraft.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed is:

1. A method of evaluating an aircraft's performance under icing conditions, comprising:
    creating a set of artificial ice sections, the ice sections being configured for sequential adjacent attachment to a surface of an aircraft to form an artificial ice component that simulates ice accretion, each ice section being marked to indicate a specific mounting location relative to other ice sections in the set;
    attaching the set of artificial ice sections to the surface of the aircraft via a double-sided adhesive system;
    flight testing the aircraft to evaluate the aircraft's performance; and
    removing the ice sections from the aircraft by disrupting the adhesive system.

2. The method of claim 1, wherein the adhesive system includes a double-sided foam tape configured for attaching the artificial ice sections to the surface of the aircraft, and line members configured for disrupting the adhesive system attaching the artificial ice sections and the aircraft after flight testing.

3. The method of claim 1, further comprising:
    including plural line members between artificial ice sections and the surface of the aircraft, the removing step including disrupting the adhesive system by translating the line members through the adhesive system.

4. The method of claim 1, wherein the creating step includes digitally designing surface roughness features for the artificial ice sections consistent with a surface roughness of ice accretion.

5. The method of claim 1, further comprising:
    applying a protective layer to the surface of the aircraft prior to the attaching step.

6. The method of claim 1, wherein the surface of the aircraft includes a leading edge of a wing.

7. The method of claim 1, wherein the surface of the aircraft includes a leading edge of a vertical stabilizer or a horizontal stabilizer.

8. The method of claim 1, wherein the adhesive system includes double-sided foam tape and a string, the removing step including, for each section, pulling the string through the double-sided foam tape to detach the section from the surface of the aircraft.

9. A method of preparing an aircraft for evaluating its performance under icing conditions, comprising:
    designing an artificial ice component having an inner surface contoured to complement a selected aircraft surface, and an outer surface contoured to simulate ice accretion;
    manufacturing the artificial ice component; and
    installing the component on the selected aircraft surface.

10. The method of claim 9, wherein the designing step includes the step of specifying surface roughness features for the artificial ice component consistent with a surface roughness of ice accretion.

11. The method of claim 9, wherein the artificial ice component includes a set of sections configured for sequential adjacent attachment to the selected aircraft surface.

12. The method of claim 11, wherein the artificial ice component is configured for installation on a leading edge of a wing of an aircraft.

13. The method of claim 11, wherein the artificial ice component is configured for installation on a leading edge of a horizontal or vertical stabilizer of an aircraft.

14. The method of claim 11, wherein the manufacturing step includes producing the sections of the artificial ice component by additive layer manufacturing.

15. The method of claim 11, wherein the manufacturing step includes producing one or more sections with a honeycomb internal structure.

16. The method of claim 11, wherein the designing step includes configuring each section of the artificial ice component for attachment to a particular location on the selected aircraft surface.

17. The method of claim 11, wherein the manufacturing step includes the step of marking each section with an indication of where the section is to be located relative to the other sections when attached to the aircraft surface.

18. A method of modifying a vehicle using an artificial environmental accretion, comprising:
    designing an artificial environmental accretion component having an inner surface contoured to complement a selected vehicle surface, and an outer surface contoured to simulate a selected environmental accretion;
    manufacturing the artificial environmental accretion component; and
    installing the component on the selected vehicle surface.

19. The method of claim 18, wherein the artificial environmental accretion component is contoured to simulate an accretion of mud, snow, or ice.

20. The method of claim 18, wherein the selected vehicle is a wheeled motor vehicle.

* * * * *